Oct. 6, 1959     L. R. ORD     2,907,086

HOSE CLAMP

Filed Feb. 25, 1957

INVENTOR.
LEWIS R. ORD
BY
Reynolds, Beach & Christensen
ATTORNEYS

United States Patent Office 2,907,086
Patented Oct. 6, 1959

2,907,086

HOSE CLAMP

Lewis R. Ord, Toronto, Ontario, Canada

Application February 25, 1957, Serial No. 642,089

8 Claims. (Cl. 24—19)

The present invention concerns a clamping band such as is commonly used for clamping the end of a length of hose to a protruding spigot. Such hose clamps need to be tightened progressively and surely, or loosened from time to time, and often the space available to them is restricted, and they should project from the surface of the hose to a minimum degree. Likewise, the tightening means, which in the present instance takes the form of a cam disk, should be protected against accidental disengagement in use. In addition, such a tightening element should be of such form and arrangement that before one tooth is disengaged by the tightening element, another tooth will be engaged with that element, so that the tightening can be both progressive and secure against accidental disengagement in the process of tightening. The structure should be simple, inexpensive, and easily manufactured.

With such objects in mind and others as will appear hereinafter, the present invention comprises the novel clamp as shown in different exemplary forms in the accompanying drawings, and as will be more fully described in this specification and defined by the claims which terminate the same.

Figure 1:
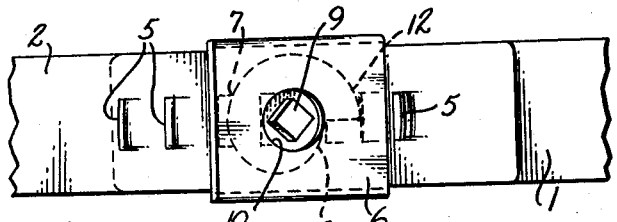
Figure 1 is a plan view of a hose clamp according to this invention, in one form of execution.

In brief, the present invention includes a metallic band which, in use, encircles the end of a hose and a spigot over which the hose end is drawn, so that the opposite ends of the band overlap. The overlying end of the band is formed with successive teeth upstanding from the band and the underlying end of the band, differing from other devices of like character, is provided with a housing or cage which encircles the opposite end, and is more or less flat to the band and upstands but slightly therefrom, within which cage is supported and held in position a tightening element in the form of a cam disk, rotative in a plane parallel to the ends of the band, or nearly so. This disk has a rim which engages successive teeth as it rotates within the cage. This rim has two portions spaced along a common radius of the disk, the radially inner of which portions engages one tooth and the radially outer portion of which engages another tooth, usually the next tooth in succession. Thus, these two portions can be simultaneously engaged. These two inner and outer rim portions are joined by a spiral portion, so that a tooth engaged by the inner portion is drawn along by the intermediate portion as the cam is rotated, until the tooth eventually arrives at the location of the outer portion, by which time the inner portion has engaged a following tooth. The axis of rotation of the cam disk is directed upstandingly with respect to, and generally normal to, the toothed surface of the band. The cam disk is capable of being rotated by various means, and two examples of suitable means are shown in the drawings. The cam disk is shown in two forms, in one of which it is domed, and its rim is flanged for engagement with the teeth. In the latter form the cam disk may be capped by a washer integral with the disk, located just beneath the outer cage wall, and bearing thereon to steady the cam disk and to transmit the reaction from the tooth to the cage.

Such a hose clamp has the advantage over those known to me wherein a worm screw is directed with its axis generally tangentially to the circle formed by the clamping band, that the cam disk projects above the band to a lesser degree, and, moreover, the cam disk within its cage is protected from accidental engagement which might disengage it from the teeth, whereas in some hose clamps which are tightened by a tangential worm pinion, the clamp is loosened by tilting the worm out of engagement with the teeth. This always affords the possibility of accidental disengagement, in the same manner.

In the drawings (Figures 1, 2, and 3A, 3B, and 3C) the underlying end of the band is represented at 1 and the overlying end at 2, encircling a hose 3 and a spigot end 4. The end 2 is toothed, and the band being of metal the teeth 5 may be struck up from the metal at regular intervals. A cage 6 is bonded to or otherwise formed integrally with the underlying end 1, and encircles the overlying end 2 threaded through it.

Within the cage is supported a cam disk 7, for rotation. The cage, in the form of Figures 1 and 2, has its outer or top wall at a slight angle to the band ends beneath, but is approximately parallel thereto. The cam disk bears beneath the cage wall, and is retained by a hooked retainer 8. The cam disk is rotative about an axis generally normal to the plane of the band end 2, and the means for effecting its rotation is not highly important. In Figures 1, 2, and 3A, 3B and 3C it is shown as provided with an upwardly projecting squared end 9 of squared form, for example, for engagement by a wrench or the like, and in Figures 4 and 5 the corresponding cam disk can be engaged and rotated by a screw driver. Access is had to the rotating element by an access opening 10 in the wall of the cage.

The cam disk 7 of Figures 1, 2, 3A, 3B, and 3C is nearly flat. A radially outer rim portion 12 will engage one tooth 5, and a radially inner rim portion 13, spaced inwardly along the same radius, will engage another tooth. An intermediate spirally curved rim portion 14 smoothly joins the portions 12 and 13, and bears at 8 as it serves as a cam to draw the band ends more tightly together as the cam disk 7 rotates.

Figure 2:
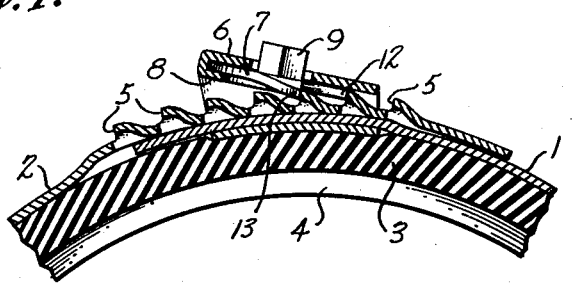
Figure 2 is a longitudinal sectional view of such a hose clamp.

The flatness of the cam disk in this form requires its tilting to a slight degree in order to engage two teeth simultaneously, for smooth transferrence of the tensioning force from one tooth to the next. By depressing the radially inner portion 13, as is seen in Figures 2 and in 3B and 3C, the angle of tilt can be lessened. Whatever the tilt of the cam disk, and whatever the forces applied thereto, the cage securely retains the cam disk in position for engagement with a tooth or teeth.

Figure 4:
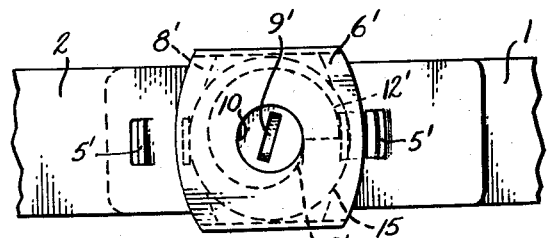
Figure 4 is a plan view of a second form of the hose clamp.
Figure 3A:
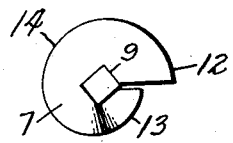
Figures 3A, 3B and 3C are, respectively, a plan view, an edge view from a viewpoint at the right of Figure 3A, and an edge view from a viewpoint at the bottom of that figure, illustrating the cam disk employed in this form.
Figure 3B:
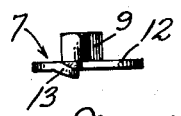
Figure 5:
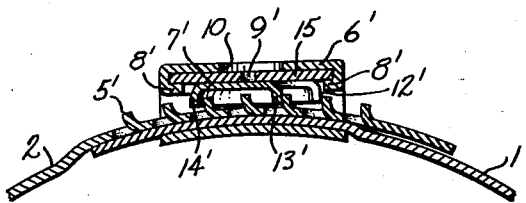
Figure 5 is a longitudinal section of this second form.
Figure 3C:
Figure 6:
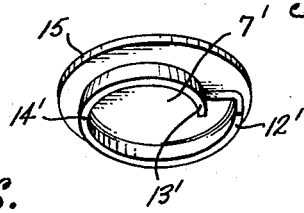
Figure 6 is an isometric view of the cam disk used in the second form.

In the form of Figures 4, 5 and 6 the cam disk is of domed and flanged form, and as a result can lie in a plane exactly parallel with the band ends. The disk 7' is flanged about its outer edge, and the outer portion 12' of such flange and the inner portion 13' thereof engage as before, but by the smoothly spirally curved intermediate circumferential portion 14' of the flange instead of the edge. The cage 6' is flat, and the cam disk is held positively in position, and prevented from wobbling, by a washer or supplemental disk 15, not necessarily a part of the cam disk, but usually formed separately therefrom, but overlying the dome of the cam disk 7', and bonded to or otherwise formed integral with the same. This washer 15 is circular, and is retained at its edges by the hooked edges 8' of the cage.

If the screw driver slot 9' be formed in the washer 15 only, a screw driver used to rotate the disk will bottom upon the dome thereof, and there is no possibility of its projecting so far inwardly as to interfere with the teeth 5', or otherwise obstructing the operation.

The several parts of this hose clamp are readily and inexpensively formed as stampings, even from stainless steel throughout, in addition to offering greater security and less likelihood of accidental disengagement, with minimum bulk.

While two different forms of rotating means are shown in conjunction with the two different forms of cam disk, it will be recognized that either form of rotating means might be employed with either style of cam disk. It will be recoginzed that it is simpler to apply a rotating force directed towards the interior of the encircled squared end, than such a force directed tangentially thereof, as has usually been the case heretofore.

I claim as my invention:

1. A clamp including a metallic band provided at one end with a plurality of teeth evenly spaced in the length of the band, a cage formed on the opposite end of the band and in use overlying said teeth, a cam disk rotatably supported within said cage with its axis directed in use generally upstandingly relative to the toothed end of the band, and said cam disk having radially inner and outer rim portions engageable with successive teeth and spaced from one another by the spacing between teeth, and a curved intermediate rim portion smoothly joining said inner and outer rim portions.

2. A clamp as in claim 1, the cam disk being generally flat and engaging the teeth at its edge, the cage being tilted sufficiently to tilt the cam disk so that its radially outer edge portion will fit between adjacent teeth in order to engage one such tooth, and the radially inner portion being deflected towards the toothed band portion, to engage the second such tooth.

3. A clamp as in claim 1, wherein the cam disk includes a flange at its outer edge portion, said flange being adapted to engage said teeth.

4. A clamp as in claim 3, including a circular washer integral with the cam disk, outstanding at least to the greatest radius thereof, and contacting the inner surface of the apertured outer wall of the cage, to close its aperture, and bearing at its edge upon the cage.

5. A clamp as in claim 1, the cam disk having means centrally disposed for engagement by a rotating tool, the outer wall of the cage being apertured for access of such a tool to the tool-engaged means of the disk.

6. A clamp as in claim 5, wherein the cam disk is centrally apertured for engagement by a screw driver or like tool.

7. A clamp as in claim 5, wherein the cam disk is provided with a centrally positioned outstanding spigot for engagement by a wrench or like tool.

8. A hose clamp or the like comprising a constrictive band having its ends overlapped, a cage formed upon one end, its other end, beneath the cage, having a plurality of upstanding, transverse teeth, equally spaced lengthwise of the band, a cam disk rotatively supported within the cage with its axis of rotation in use generally normal to the toothed surface of the band, said cam disk having a rim projecting towards and engageable with the teeth, the radially outermost portion of said rim being spaced, along a radius of the disk, from the innermost portion of the rim, by a distance equal to the spacing between teeth, and said rim having a smoothly curved intermediate portion joining said innermost and said outermost rim portions.

References Cited in the file of this patent
UNITED STATES PATENTS

| | | |
|---|---|---|
| 621,415 | Hodges et al. | Mar. 21, 1899 |
| 1,072,253 | Peck | Sept. 2, 1913 |

Notice of Adverse Decision in Interference

In Interference No. 91,618 involving Patent No. 2,907,086, L. R. Ord, Hose clamp, final judgment adverse to the patentee was rendered April 11, 1961, as to claims 1, 3, 4, 6, 7, and 8.

[*Official Gazette June 6, 1961.*]